Patented June 5, 1951

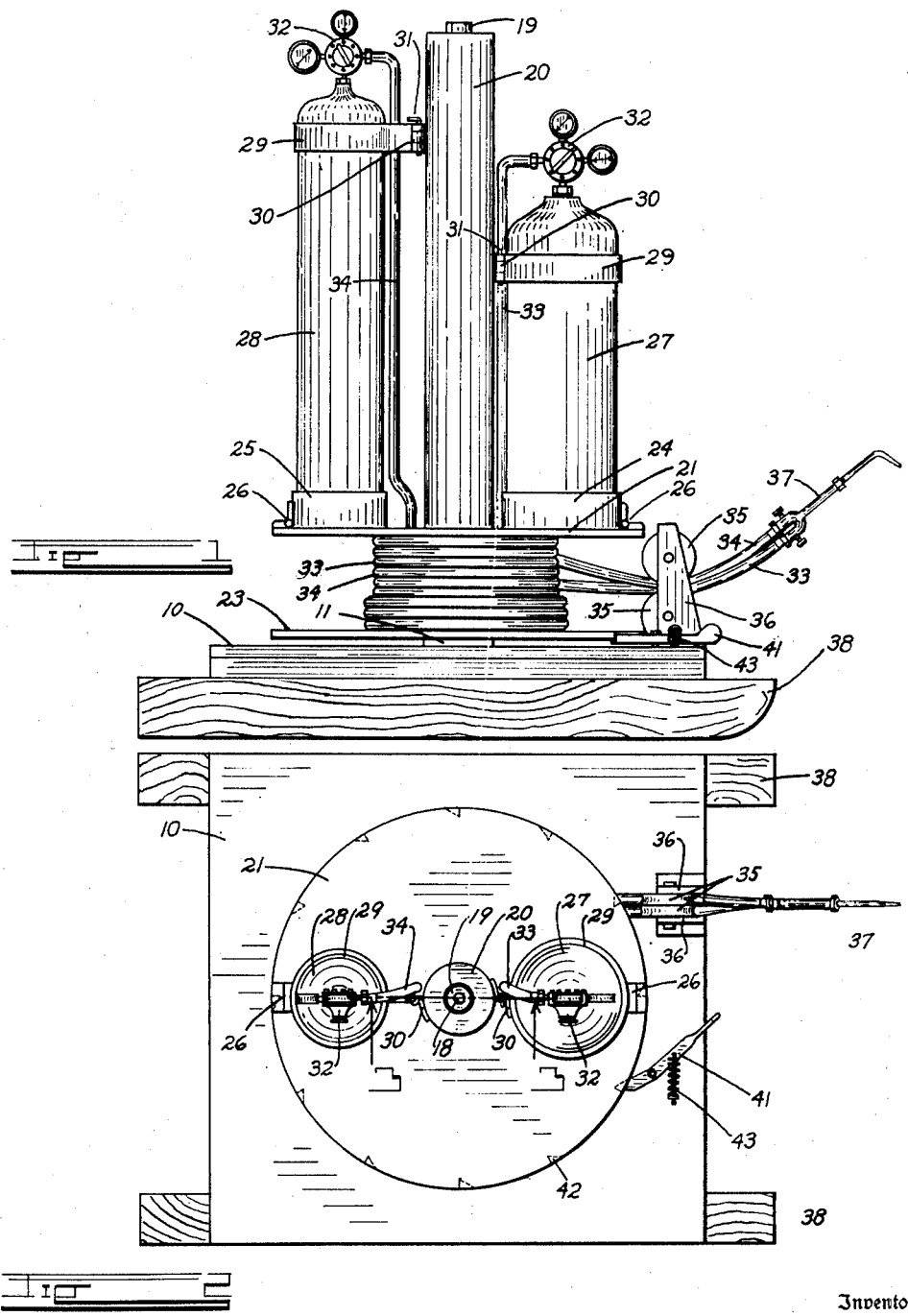
June 5, 1951 — C. D. McELROY ET AL — 2,555,856
REVOLUBLY SUPPORTED STAND FOR GAS CONTAINERS HAVING
ATTACHED DISPENSING HOSES AND A REEL, INTEGRAL
WITH THE STAND, FOR SAID HOSES
Filed Sept. 6, 1947 — 2 Sheets-Sheet 1
Inventors
CHARLES D. McELROY
KERMIT E. NEWKIRK
By
Attorney

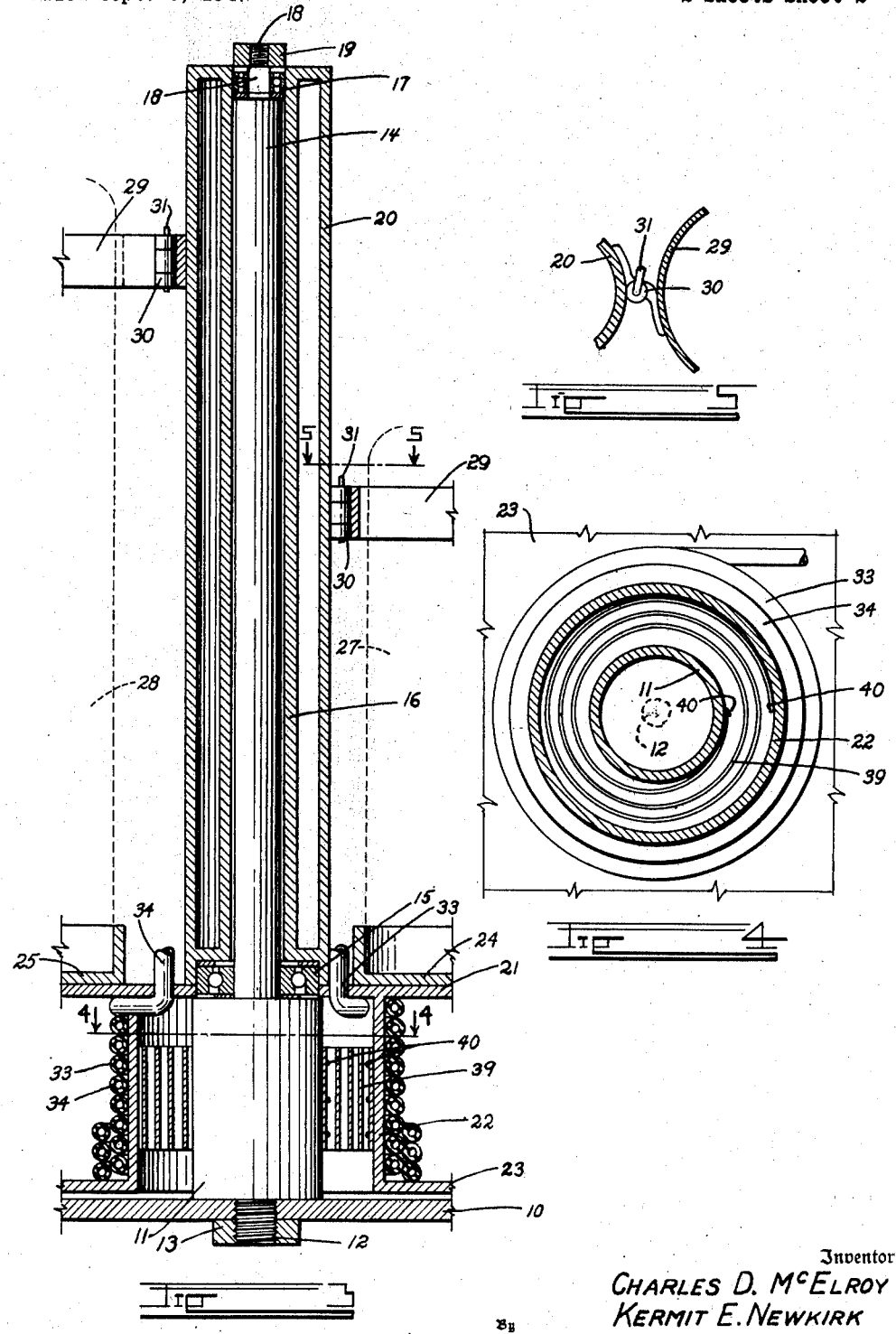

2,555,856

UNITED STATES PATENT OFFICE 2,555,856

REVOLUBLY SUPPORTED STAND FOR GAS CONTAINERS HAVING ATTACHED DISPENSING HOSES AND A REEL, INTEGRAL WITH THE STAND, FOR SAID HOSES

Charles D. McElroy and Kermit E. Newkirk, Pueblo, Colo.

Application September 6, 1947, Serial No. 772,480

1 Claim. (Cl. 222—144)

This invention relates to oxy-acetylene equipment for welding with acetylene and oxygen gases. Such an outfit requires a bottle of each gas and a hose running from each bottle to a welding torch. In large shops, garages, etc., it is necessary to either take the work to the outfit or to drag the hoses over the floor where they become entangled and damaged. Portable welding devices require the hose to be wound on suitable receiving posts or the like on a truck or other vehicle carrying the outfit. It is difficult to wind the hoses on the posts and they often become kinked and damaged.

The principal object of this invention is to provide an automatic hose reel for oxy-acetylene hoses which will automatically reel in the unnecessary slack in the hose; which will completely reel in the hoses when the device is not in use; and in which there will be no possibility of gas leakage.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved oxy-acetylene welding outfit;

Fig. 2 is a plan view thereof;

Fig. 3 is an enlarged vertical section taken on the line 3—3, Fig. 2;

Fig. 4 is a similarly enlarged horizontal section taken on the line 4—4, Fig. 3; and Fig. 5 is a detail, fragmentary, sectional view, taken on the line 5—5, Fig. 3.

The improved oxy-acetylene outfit is mounted upon a suitable base plate 10 which may be mounted on any desired supporting structure such as skids 38. An upright pedestal 11, is secured to the plate 10 in any desired manner such as by means of a threaded attachment stud 12 and a clamp nut 13. A vertical pivot post 14 is formed on the pedestal 11 and arises axially therefrom. The pivot post is of less diameter than the pedestal so that a shoulder is provided at the top of the latter.

The shoulder supports suitable thrust bearings 15 upon which a tubular sleeve 16 rests. The sleeve 16 rotatably surrounds the post 14 and it is supported vertically thereon by means of an upper radial anti-friction bearing 17. The bearing 17 surrounds a bearing stud 18 formed on the top of the post 14 and is held in place thereon by means of a bearing nut 19. A rotatable tube 20 is formed on and about the sleeve 16 as an integral part thereof.

A circular reel plate 21 is welded or otherwise attached to and about the lower extremity of the tube 20. A cylindrical hose drum 22 is affixed to and extends concentrically downward from the reel plate 21 terminating in a bottom reel flange 23. Thus, the entire structure, consisting of the tube 20, the reel plate 21, the hose drum 22, and the reel flange 23, rotates freely about the axis of the post 14 supported by the bearings 15 and 17.

The reel plate 21 is provided with two bottle cups 24 and 25 which are hinged to the plate 21 by means of suitable hinges 26. The cup 24 is designed to support an oxygen bottle 27 and the cup 25 is designed to support an acetylene bottle 28. The bottles 27 and 28 are held in fixed relation to the vertical tube 20 by means of annular straps 29. The straps 29 are of a size to snugly surround the bottles and are removably attached to the tube 20 by means of separable attachment clips 30 which can be separated by withdrawing removable locking pins 31.

The bottles 27 and 28 are provided with the usual pressure reducing valves 32 from which flexible hoses 33 and 34 lead through suitable openings in the plate 21 and are wound about the hose drum 22 between the reel plate 21 and the flange plate 23. The free extremities of the hoses 33 and 34 extend between guide sheaves 35 rotatably mounted in a sheave bracket 36 on the base plate 10. The hoses terminate in a conventional welding or cutting torch 37.

When it is desired to use the torch 37 it is simply carried to the job. This causes the hoses 34 and 36 to unroll from the reel drum 22 rotating the entire mechanism including the bottles 27 and 28, about the pivot post 14.

The hoses are reeled back upon the reel drum 22 by means of a flat coiled spring 39 which surrounds the pedestal 11 within the drum 22. This spring is similar to the usual clock spring except on a much larger scale. One extremity of the spring 39 is permanently attached to the pedestal 11 by means of suitable attachment screws 40. The other extremity is secured to the inside of the drum 22. The spring is so arranged that when the hoses are withdrawn it will be wound and when the hoses are released it will unwind and rotate the entire apparatus, The reel drum is prevented from rotating under the influence of the spring by means of a latch pawl 41 which engages suitable ratchet notches 42 in the periphery of the flange plate 23. The latch pawl 41 is constantly urged against the peripheral edge of the flange plate 23 by means of a suitable spring 43.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

An oxy-acetylene welding outfit comprising: a base plate; a vertical axis post arising from said base plate; a hose reel rotatably surrounding said post so as to rotate in a horizontal plane; gas containers mounted on the upper side of said reel eccentrically of the axis of said post so as to travel in circular orbits about said axis as said reel rotates; a hose extending from each of said containers, said hoses being wound about said reel intermediate their extremities; a rotatable sleeve surrounding said post above said reel, said sleeve being secured to said reel so as to rotate therewith; and supporting means carried from said sleeve for supporting said gas containers on said reel.

CHARLES D. McELROY.
KERMIT E. NEWKIRK.

REFERENCES CITED

The following references are of record in the file of this patent:

UNITED STATES PATENTS

| Number | Name | Date |
|---|---|---|
| 934,123 | Wurmfeld et al. | Sept. 14, 1909 |
| 1,518,881 | Walker et al. | Dec. 9, 1924 |
| 1,746,995 | Edwards | Feb. 11, 1930 |
| 1,791,987 | Voorhees | Feb. 10, 1931 |
| 2,141,337 | Bailey | Dec. 27, 1938 |
| 2,149,861 | Morton | Mar. 7, 1939 |
| 2,170,281 | Snow | Aug. 22, 1939 |